US009197980B2

(12) United States Patent
Pazhyannur et al.

(10) Patent No.: US 9,197,980 B2

(45) Date of Patent: Nov. 24, 2015

(54) MULTI-OPERATOR WIRELESS NETWORKING

(75) Inventors: Rajesh S. Pazhyannur, Milpitas, CA (US); Kent K. Leung, Palo Alto, CA (US); Sri Gundavelli, San Jose, CA (US); Sudhir Kumar Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 615 days.

(21) Appl. No.: 13/591,343

(22) Filed: Aug. 22, 2012

(65) Prior Publication Data

US 2014/0056290 A1 Feb. 27, 2014

(51) Int. Cl.

*H04W 4/00* (2009.01)
*H04L 12/46* (2006.01)
*H04W 80/04* (2009.01)

(52) U.S. Cl.

CPC ............. *H04W 4/00* (2013.01); *H04L 12/4625* (2013.01); *H04L 12/4641* (2013.01); *H04W 80/045* (2013.01)

(58) Field of Classification Search

CPC ..................................................... H04W 40/02

USPC ........................................................... 370/338

See application file for complete search history.

(56) References Cited

U.S. PATENT DOCUMENTS 6,807,431 B2 10/2004 Sayers et al.
7,876,704 B1 * 1/2011 Bims et al. .................... 370/254
8,064,909 B2 11/2011 Spinelli et al.
2005/0059390 A1 3/2005 Sayers et al.
2007/0243872 A1 * 10/2007 Gallagher et al. ............ 455/436
2012/0044908 A1 2/2012 Spinelli et al.
2013/0034108 A1 * 2/2013 Kaippallimalil et al. ..... 370/401

* cited by examiner

*Primary Examiner* — Wei Zhao

(74) *Attorney, Agent, or Firm* — Edell, Shapiro & Finnan, LLC

(57) ABSTRACT

Multi-operator networking techniques are provided for allowing two or more operators to share a wireless local area network (WLAN). In particular, mobile access gateway functionality is integrated in a wireless network controller of a WLAN that is accessible to first and second operators. Operator-specific tunnels are created through the network for each of the first and second operators that link a core network of each of the first and second operators with an associated client device. Packets are then forwarded between the core networks of the first and second operators and their associated client devices via the operator-specific tunnels.

28 Claims, 7 Drawing Sheets

MULTI-OPERATOR WIRELESS NETWORKING

TECHNICAL FIELD

The present disclosure relates generally to wireless networking.

BACKGROUND

The use of computers, mobile phones, etc. for communication outside the home and office is widespread. As a result of the proliferation of these devices, numerous voice and data services have been made available to consumers, many of which are offered under different service plans provided by many different service providers and/or system operators (collectively and generally referred to as "operators" herein). Many devices include interfaces that enable the device to connect to wireless networks, such as wireless local area networks (WLAN) based on the Institute of Electrical and Electronics Engineers' (IEEE) 802.11 standards (commonly referred to as Wi-Fi® or WiFi networks).

Network-based mobility management protocols have been developed to support the wide-spread use of wireless devices and wireless access networks. Proxy Mobile Internet Protocol version 6 (PMIPv6 or PMIP) is one network-based mobility management protocol standardized by the Internet Engineering Task Force (IETF). The PMIPv6 allows access technology to operate independent of mobile core networks, thereby accommodating the use of different access technologies (e.g., WiMAX, 3rd Generation Partnership Project (3GPP), 3rd Generation Partnership Project 2 (3GPP2), WLAN based access architectures, etc.).

DESCRIPTION OF EXAMPLE EMBODIMENTS

Overview

Multi-operator networking techniques are provided that allow two or more operators to share a wireless local area network (WLAN). In particular, the functionality of a mobile access gateway is integrated in a wireless network controller for a WLAN that is accessible to different operators, e.g., first and second operators. Operator-specific tunnels are created through the WLAN for each of the first and second operators. The operator-specific tunnels link a core network of each of the first and second operators with an associated client device.

Packets are forwarded between the core networks of the first and second operators and their associated client devices via the operator-specific tunnels.

Example Embodiments

A wireless access network may be deployed such that it is accessible to multiple different operators. However, because the different operators operate autonomously (i.e., without any direct coordination) the sharing of the access network may result in Internet Protocol (IP) address management issues. In particular, the operators may independently assign private IP addresses in a manner such that there are overlapping/conflicting IP addresses for different devices. As such, conventional deployments are designed to prevent such overlapping IP addresses in the presence of multiple operators through the use of separate and distinct WLANs for each operator. For example, in a Proxy Mobile Internet Protocol version 6 (PMIPv6) network, client devices are served by distinct WLANs for each operator. Therefore, although the underlying access network may be the same, the client devices, in essence, communicate on logically separate wireless networks having independent IP addressing, forwarding, and routing. The use of multiple WLANs results in additional overhead (from a radio-frequency (RF) standpoint) and additional complexity (from a provisioning and management standpoint).

Multi-operator networking techniques are presented herein that allow operators to share an access network while eliminating the use of separate WLANs for each operator. More specifically, the multi-operator networking techniques create operator-specific tunnels in a shared WLAN that independently link each operator with its associated client devices. Because multiple WLANs are not used, there is a potential for overlapping IP addresses. However, the multi-operator networking techniques enable the network devices to perform correct network packet forwarding (i.e., routing/switching) despite any overlapping/conflicting IP addresses.

The multi-operator networking techniques are primarily presented herein with reference to PMIPv6 WLANs. However, it is to be appreciated that the multi-operator networking techniques may be implemented in other wireless networks, such as networks that include an Enhanced Wi-Fi Access Gateway (EWAG) and that use the General Packet Radio Service (GPRS) Tunneling Protocol (GTP).

Figure 1:
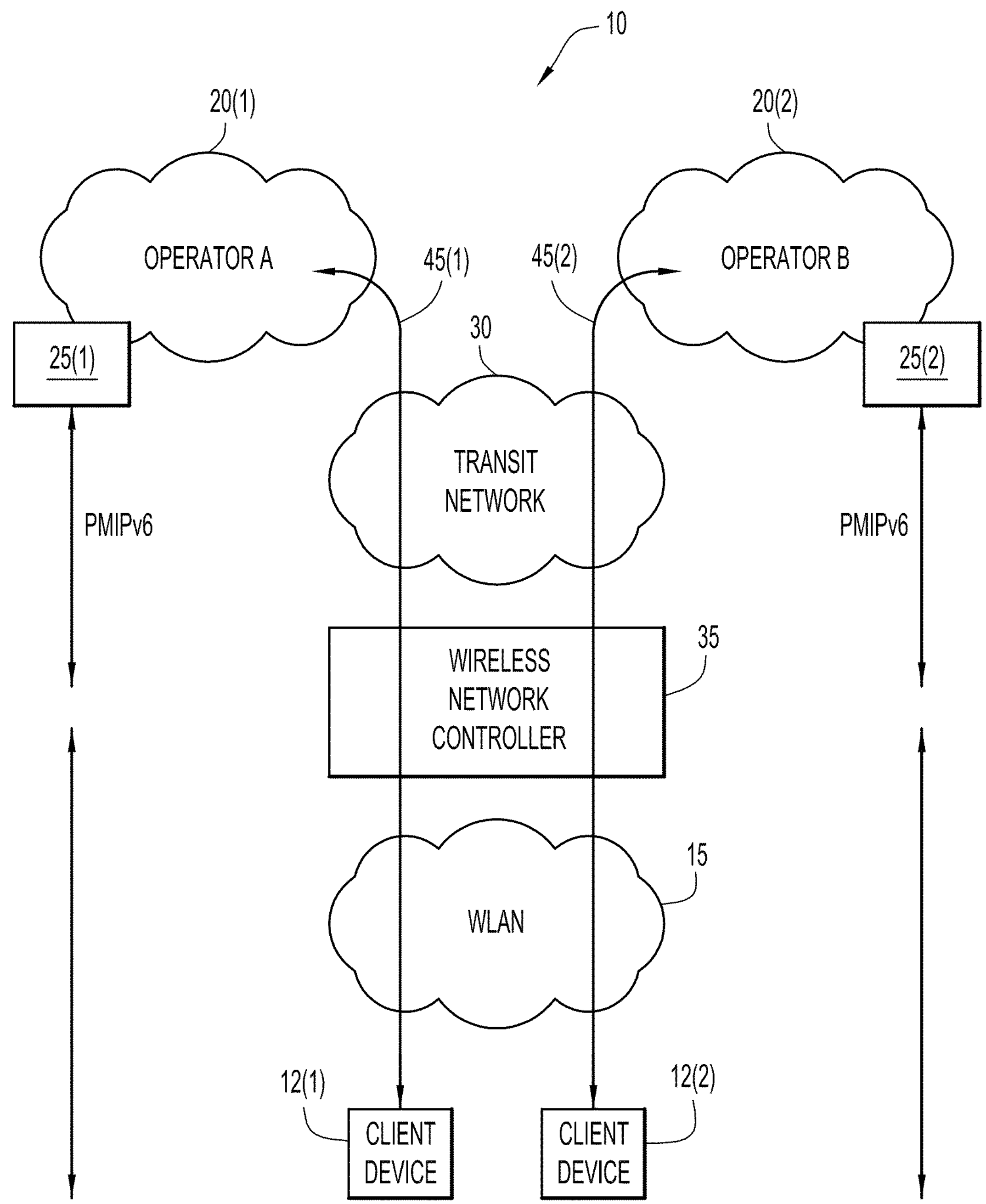
FIG. 1 is a diagram of a networking arrangement configured to execute multi-operator networking techniques.

FIG. 1 is a block diagram of a networking arrangement 10 in which the multi-operator networking techniques allow a first operator (operator A) and a second operator (operator B) to simultaneously share a WLAN 15 to communicate with respective client devices 12(1) and 12(2). The WLAN 15 depicted in FIG. 1 includes a plurality of access points (APs) that wirelessly communicate with client devices. In this arrangement, operator A and operator B each have a core network 20(1) and 20(2), respectively. The operators A and B also each host one or more computing devices (e.g., servers, computers, etc.) that are connected to the core networks 20(1) and 20(2). A computing device 25(1) is shown connected to core network 20(1), while a computing device 25(2) is shown connected to core network 20(2).

Also shown in FIG. 1 is a transit network 30 that connects the core networks 20(1) and 20(2) to a WLAN controller 35, also referred to hereinafter as a "wireless network controller". The wireless network controller 35 is disposed between the transit network 30 and the WLAN 15, and includes functionality of a mobile access gateway (MAG). Insofar as the WLAN 15 includes a plurality of APs, the wireless network controller 35 is connected (usually by wire, e.g., Ethernet) to each of the APs. For simplicity, the APs in the WLAN 15 are not shown in FIG. 1.

As described further below, the functionality of a mobile access gateway is integrated in wireless network controller 35 to provide the ability to create a plurality of operator-specific tunnels. As a result, the wireless network controller 35 is configured to operate with the PMIPv6 to create Generic Routing Encapsulation (GRE) operator-specific tunnels 45(1) and 45(2) that link each client device 12(1) and 12(2) with its associated operator 20(1) and 20(2), respectively. These operator-specific tunnels allow the WLAN 15 to be shared by the operators without a logical division of the network. Even though the operators A and B are able to independently assign IP addresses to their associated client devices 12(1) and 12(2) that may potentially conflict, the wireless network controller 35 is able to properly forward packets between the operators (i.e., computing devices 25(1) and 25(2)) and the client devices 12(1) and 12(2), respectively. Therefore, the wireless network controller 35 is able to distinguish the traffic between the core networks 20(1) and 20(2) of the different operators and the clients 12(1) and 12(2) associated with the specific operators.

FIG. 1 illustrates an example networking arrangement 10 in which two operators (operators A and B) share WLAN 15 and communicate with client devices 12(1) and 12(2), respectively. It is to be appreciated that this arrangement is only one example arrangement and has been provided merely to illustrate aspects of the multi-operator networking techniques. The multi-operator networking techniques may be implemented in a large number of other networking arrangements that include, for example, additional operators, multiple client devices associated with each operator, different network protocols, different networking devices, etc.

Figure 2:
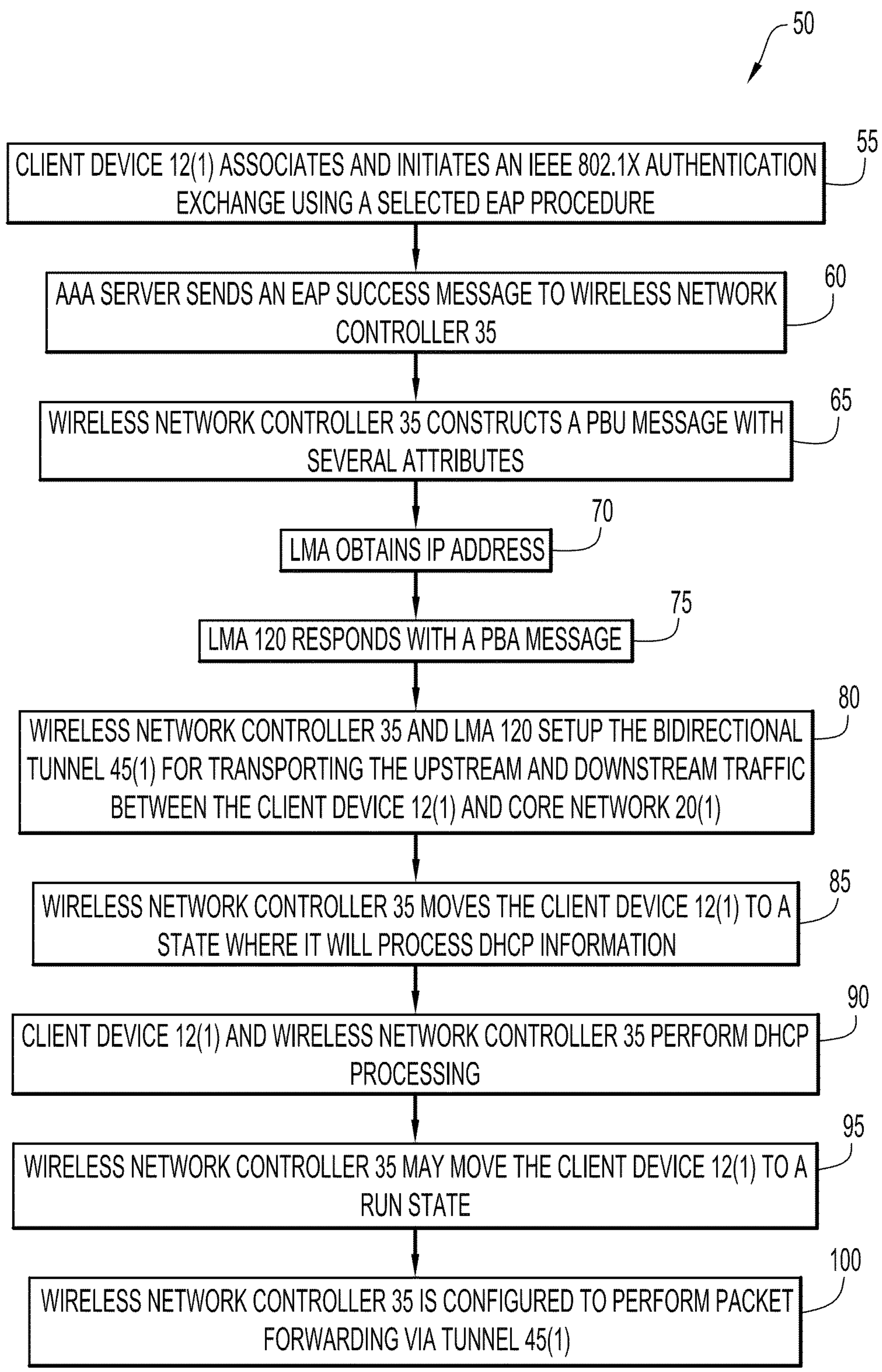
FIG. 2 is a flowchart illustrating an example method in accordance the multi-operator networking techniques.
Figure 3:
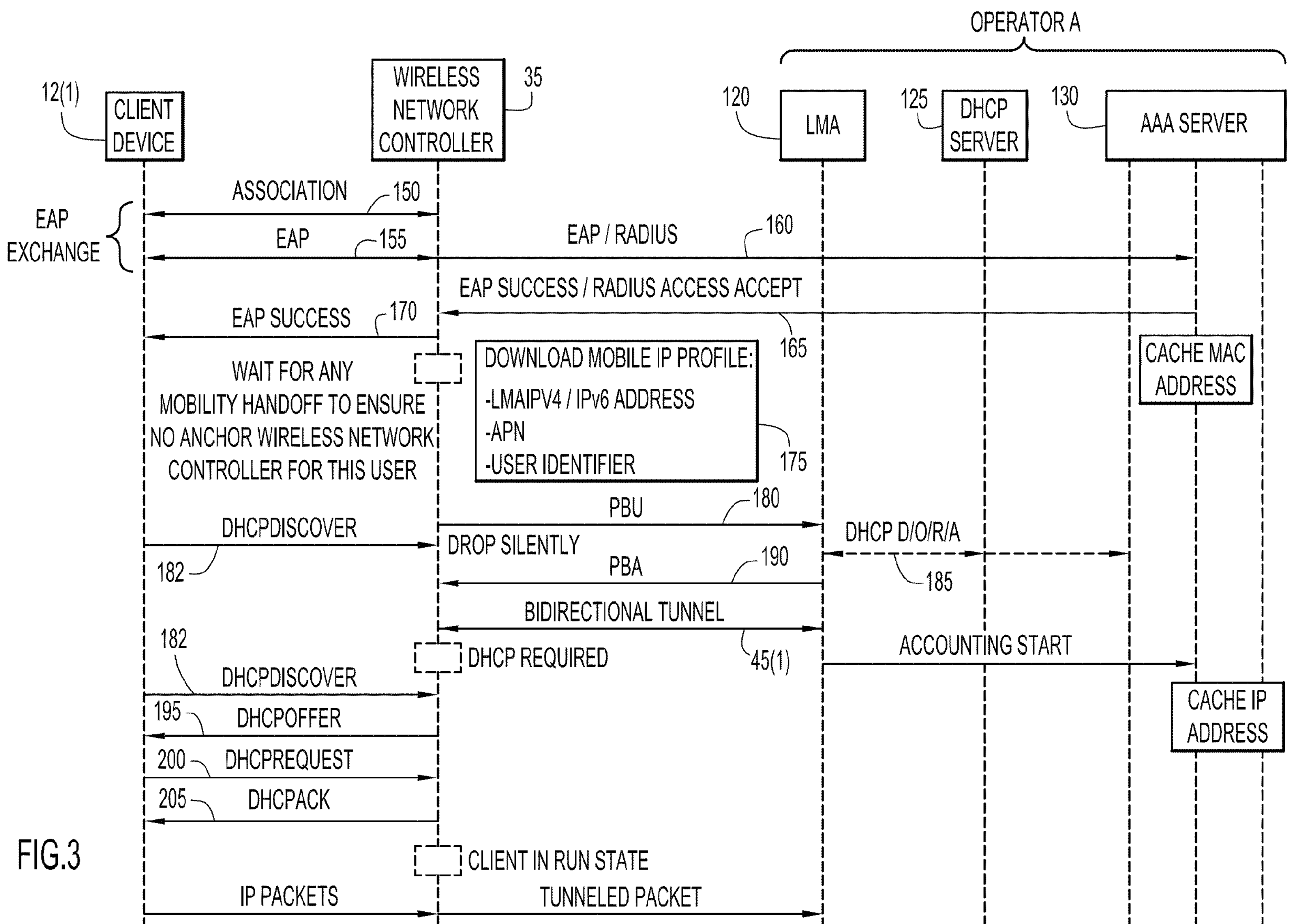
FIG. 3 is a flow diagram illustrating the exchange of messages in accordance with the method of FIG. 2.

FIG. 2 is a detailed flowchart illustrating a method 50 in accordance with the multi-operator networking techniques. FIG. 3 is a flow diagram 110 that schematically illustrates messages exchanged in the method of FIG. 2. The examples of FIGS. 2 and 3 will be described with reference to the creation of operator-specific tunnel 45(1) between the core network 20(1) of operator A and client device 12(1) shown in FIG. 1. In these examples, operator A includes a Local Mobility Anchor (LMA) 120, a Dynamic Host Configuration Protocol (DHCP) server 125, and an authentication, authorization, and accounting (AAA) server 130.

The WLAN 15 is, in this example, configured for authentication in accordance with the Institute of Electrical and Electronics Engineers (IEEE) 802.1x standard, also known as the Extensible Authentication Protocol (EAP). The AAA server 130 may be a server or an AAA proxy to support roaming scenarios or in cases where there is an external AAA server. The AAA server 130 may include, in certain examples, Subscriber Management Entity (SME) functionality. It is to be appreciated that the LMA 120, DHCP server 125, and AAA server 130 are operator specific (i.e., these elements are separately provided for each operator). In examples that use an AAA proxy, the proxy may be shared by multiple operators.

At 55, the client device 12(1) associates to an AP of the WLAN 15 and initiates an 802.1x exchange with the AAA server 130. In particular, an IEEE 802.1x authentication exchange is initiated using an EAP procedure (e.g., EAP Method for Global System for Mobile Communications Subscriber Identity Module (EAP-SIM), EAP-Flexible Authentication via Secure Tunneling (EAR-FAST), EAP-Tunneled Transport Layer Security (EAP-TTLS), EAR-Transport Layer Security, etc.). The wireless network controller 35 behaves as the authenticator and relays the EAP messages to the AAA server 130. This initial association is shown using arrow 150, and the EAP exchange is shown in FIG. 3 by arrows 155 and 160. In this example, arrow 160 represents an EAP Remote Authentication Dial-In User Service (RADIUS) message that includes the Media Access Control (MAC) address of client device 12(1). In other words, wireless network controller 35 is configured to send the client MAC address in the Calling Station ID of the RADIUS message.

After a successful EAP exchange, at 60 the AAA server 130 sends an EAP success message to wireless network controller 35. In the examples of FIGS. 2 and 3, this EAP success message is represented in FIG. 3 by arrow 165 and includes a "profile" 175 of client tunneling information for client device 12(1), sometimes referred to herein as a Mobile IP profile. Among other information, the profile 175 identifies the LMA for the client device 12(1) (i.e., the LMA to which the packets from the client device 12(1) should be tunneled).

In the specific example of FIG. 3, the EAP success message is a RADIUS Access Accept message and the Mobile IP profile 175 is comprised of RADIUS attributes that include a PMIPv6 mobility context. The PMIPv6 mobility context comprises, in this example, an Access Point Name (APN), the IP address (e.g., IPv4) of the LMA 120, and a user-identifier (e.g., Mobile Subscriber Integrated Digital Network (MSISDN), International Mobile Subscriber Identity (IMSI), username, etc.). As shown by arrow 170, the EAP success message (or information extracted therefrom) may be forwarded to client device 12(1).

At 65, the wireless network controller 35 constructs a Proxy Binding Update (PBU) message with several tunneling attributes. These attributes include a Mobile Node Identifier (MN-ID), APN information, LMA address (IPv4 address), an IPv4 Home address set to zero (since this is for initial connectivity), Handoff Indicator Option of 1 (attachment over a new interface), and GRE Key Option containing a downlink GRE key identifier. The APN information and LMA address may be obtained from the EAP Success/Access Accept message or from a locally configured value. The PBU message is represented in FIG. 3 by arrow 180.

Prior to construction of the PBU message, a DHCP request (e.g., a DHCP discover message 182 in FIG. 3) may be received. Any such DHCP requests are silently discarded as shown until after creation of tunnel 45(1).

At 70, upon receiving the PBU message, the LMA 120 may optionally contact an external DHCP server to obtain an IP address. Alternately, the LMA 120 may be locally configured with a pool of IP addresses or obtain an IP address from AAA server 130. These optional exchanges with the DHCP server 125 and/or AAA server 130 are represented in FIG. 3 by arrow 185.

At 75, the LMA 120 responds with a Proxy Binding Acknowledge (PBA) message that is represented by arrow 190 in FIG. 3. In an example using IPv4, the PBA message 190 may include an IPv4 address and subnet mask (e.g., IPv4 Home Address Reply Option), default IPv4 router (IPv4 Default Router Address Option), Domain Name Server (DNS) (obtained through PCO IE), 3GPP IPv6 error code (because the mobile access gateway functionality provides appropriate error code processing as per 3GPP error codes.), and GRE Key Option with the uplink GRE key identifier.

As a result of the above exchanges, at 80 the wireless network controller 35 and LMA 120 have a bidirectional tunnel 45(1) for transporting upstream and downstream IP packets between the client device 12(1) and core network 20(1). The wireless network controller 35 is configured to support a GRE Key Identifier and, as a result, if there is a GRE tunnel between the wireless network controller 45 and the LMA 120 prior to this client connection, then the additional tunnel setup does not occur. A set of upstream and downstream GRE keys negotiated during PBU/PBA is used to mark the upstream and downstream traffic for this mobility session.

At 85, the wireless network controller 35 moves the client device 12(1) to a state where it will process DHCP information. At 90, the client device 12(1) and wireless network controller 35 perform DHCP processing. In particular, as shown in FIG. 3, the client device 12(1) will transmit a DHCP discover message 182, and the wireless network controller 35 will respond with a DHCP offer 195. The DHCP offer 195 may include, for example, the IPv4 Home Address, Subnet Mask, Router information, DNS information, Lease Time, and/or Server Identifier (e.g., virtual IPv4 address of the wireless network controller). The lease option is based on granted lifetime in the PBA message. The client device 12(1) may then respond with a DHCP Request represented by arrow 200. The DHCP Request is expected to contain the IP address provided in the DHCP offer. Upon validation, the wireless network controller 35 will respond with a DHCP Acknowledge (ACK) to the client device 12(1). The DHCP ACK is represented in FIG. 3 by arrow 205.

At 95, the wireless network controller 35 may move the client device 12(1) to a run state. At 100, while the client device 12(1) is in this run state, wireless network controller 35 is configured to perform packet forwarding via tunnel 45(1). More specifically, all IP packets received from the client device 12(1) are tunneled by the wireless network controller 35 to the LMA 120. Additionally, all IP packets destined to the client device 12(1) from the core network 20(1) are tunneled by the LMA 120 to the wireless network controller 35. The wireless network controller 35 is configured to use the GRE key as an index to a Binding Cache Entry (BCE) and determine the MAC address of the client device 12(1). The wireless network controller 35 is then configured to construct a Layer 2 (L2) packet based on the client device MAC address and send it over the L2 interface to the client.

In the examples described above, the wireless network controller 35 is connected to multiple LMAs, one for each operator. Because the LMAs belong to different operators and are not coordinated, they will allocate private IP addresses to client devices. As a result, multiple client devices which communicate with the same wireless network controller through the same WLAN (and on the same VLAN) may be assigned the same IP address. Additionally, a WLAN may support two types of client devices, namely (1) PMIPv6 devices where the IP address is provided by the LMA, and (2) simple IP devices where the IP address is provided by a local DHCP server. As a result, a PMIPv6 user and a simple IP user may be assigned the same IP address. As described below, the multi-operator networking techniques are implemented such that correct packet forwarding occurs even in the presence of such overlapping IP address.

Figure 4:
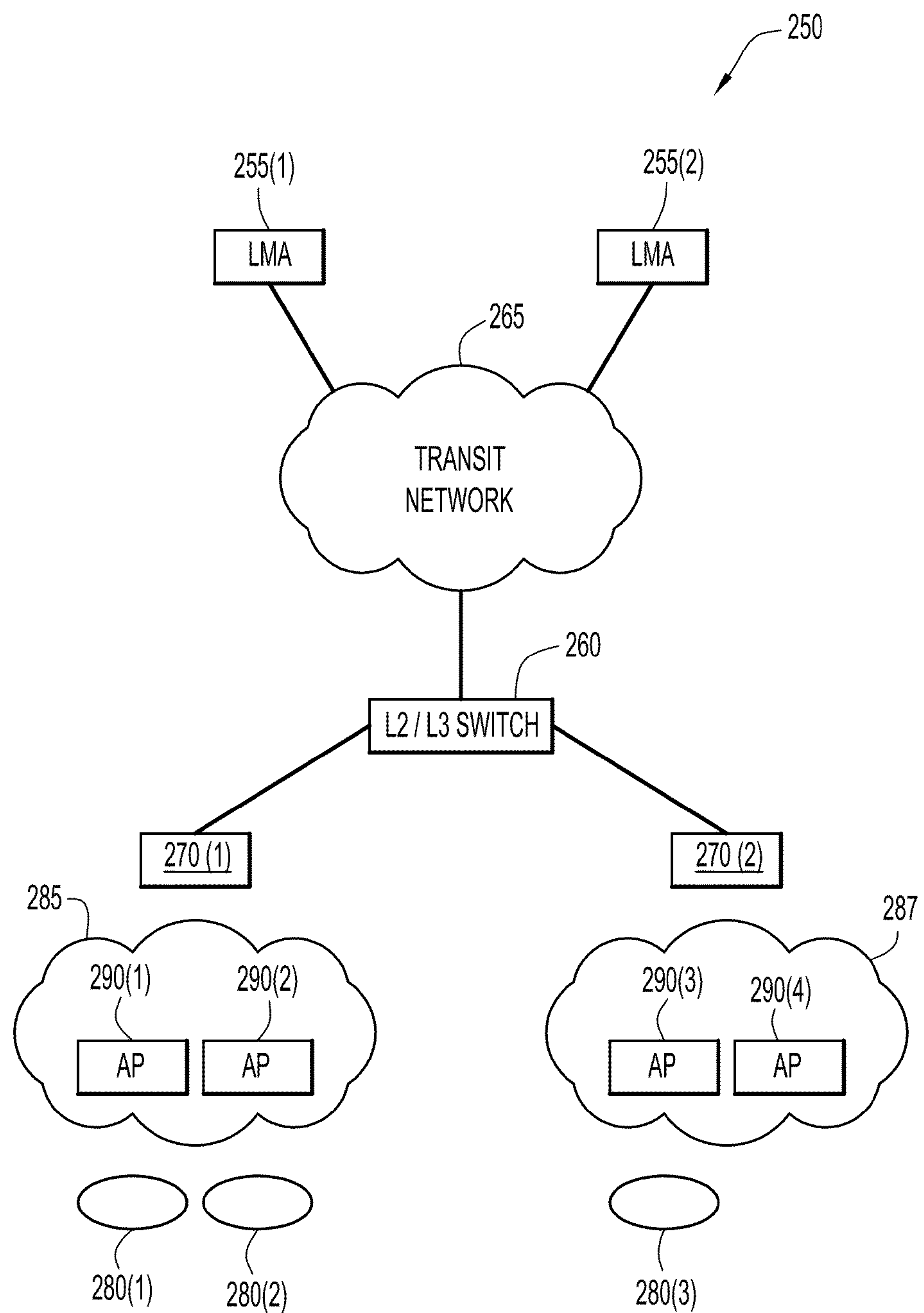
FIG. 4 is a diagram of a networking arrangement in which multiple client devices are assigned overlapping IP addresses.

FIG. 4 illustrates the use of the multi-operator networking techniques in an arrangement 250 that only comprises PMIPv6 devices (i.e., no simple IP devices) that have overlapping IP addresses. The arrangement 250 includes LMAs 255(1) and 255(2) corresponding to first and second operators, respectively. The LMAs 255(1) and 255(2) are connected to a switch (e.g., L2/L3 switch) 260 via a transit network 265. Additionally, this arrangement 250 includes first and second wireless network controllers 270(1) and 270(2) that each have embedded mobile access gateway functionality. Client devices 280(1) and 280(2) are wirelessly associated to access points 290(1) and 290(2), respectively, which are connected to wireless network controller 270(1) of WLAN 285. Similarly, client device 280(3) is wirelessly associated to access point 290(3) which is connected to wireless network controller 270(2) of WLAN 287. A fourth access point 290(4) in WLAN 287 is shown, but does not have a client device connected thereto.

The different LMAs 255(1) and 255(2) may assign the same IP address to different client devices on a given wireless network controller. For example, two clients 280(2) and 280(3) on the same WLAN and VLAN have the same IP address. Although clients 280(2) and 280(3) are shown associated to different access points and different wireless network controllers, the client devices with overlapping IP addresses could be associated to any one of the access points 290(1)-290(4) (i.e., the same access point or different access points on the same or different wireless network controller).

To ensure correct processing of upstream packets in the presence of overlapping IP addresses, the mobile access gateway functionality allows the wireless network controllers 270(1) and 270(2) to process incoming packets based on the incoming MAC address (i.e., the MAC address of the transmitting client device) and use this incoming MAC addresses to determine the correct tunnel identifiers (e.g., GRE key, LMA IP address, etc.). In other words, although client devices 280(2) and 280(3) may have the same assigned IP addresses, their respective MAC addresses are unique. The wireless network controllers 270(1) and 270(2), by virtue of the integrated mobile access gateway functionality, are then able to use the incoming MAC addresses as identifiers to locate the correct tunneling information. In an example that includes simple IP clients, any packets received from such simple IP clients would be bridged as per existing wireless network controller methods.

To ensure correct processing of downstream packets in the presence of overlapping IP addresses, the wireless network controllers 270(1) and 270(2), by virtue of the integrated mobile access gateways functionality, are configured to process packets based on downstream GRE keys. The downstream GRE keys are generated by the mobile access gateways functionalities in wireless network controllers 270(1) and 270(2), and there is one unique GRE key per client. Therefore, since downstream GRE keys are unique (even if LMAs are different), the wireless network controllers 270(1) and 270(2) can use the GRE keys as identifiers to locate any information useable to correctly forward packets along the appropriate tunnel. Packets for simple IP clients are bridged as per existing wireless network controller methods.

The Address Resolution Protocol (ARP) is used to connect together the various networking layers within a computing network (e.g., to connect the IP and Ethernet networking layers). Since networking hardware such as switches, hubs, routers, and bridges operate on, for example, Ethernet frames, these devices are unaware of the higher layer data carried by these frames. Similarly, IP layer devices, operating on IP packets, need to be able to transmit their IP data on the Ethernet layer. The ARP defines the mechanism by which IP capable hosts can exchange mappings of their Ethernet and IP addressing. The ARP is used primarily in conjunction with IP Version 4 (IPv4). More specifically, the ARP may be used to map IP addresses to a host address (i.e., a Media Access Control (MAC) address) that is recognized in the local network. For example, in IPv4, an IP address may be 32 bits long, but the Ethernet local area network (LAN) MAC addresses may be 48 bits long. A table, referred to herein as the ARP cache or ARP table, is used to maintain a correlation between each MAC address and its corresponding IP address.

Proxy-ARP is a feature supported by network devices that allows an intermediate device to respond to an ARP request from a source device on behalf of a destination device. In essence, the intermediate network device pretends to be the destination device and will perform forwarding when it receives the packets from the source device. The proxy-ARP functionality is supported in arrangement 250 by the mobile access gateway functionality of wireless controllers 270(1) and 270(2). More specifically, in processing ARP requests at the wireless network controllers 270(1) and 270(2) for client devices having overlapping IP addresses (e.g., client devices 280(2) and 280(3)), if the requester is a PMIPv6 wireless client, the wireless network controllers 270(1) and 270(2) are configured to proxy-ARP with its own (virtual) MAC address. If the requester is a wired client (i.e., a client that is on the distribution system), the wireless network controllers 270(1) and 270(2) will respond with a proxy-ARP only if there was a simple IP client with a matching IP address. If there is a PMIPv6 client with a matching IP address, then the wireless network controllers 270(1) and 270(2) would not proxy-ARP on behalf of that client.

Figure 5:
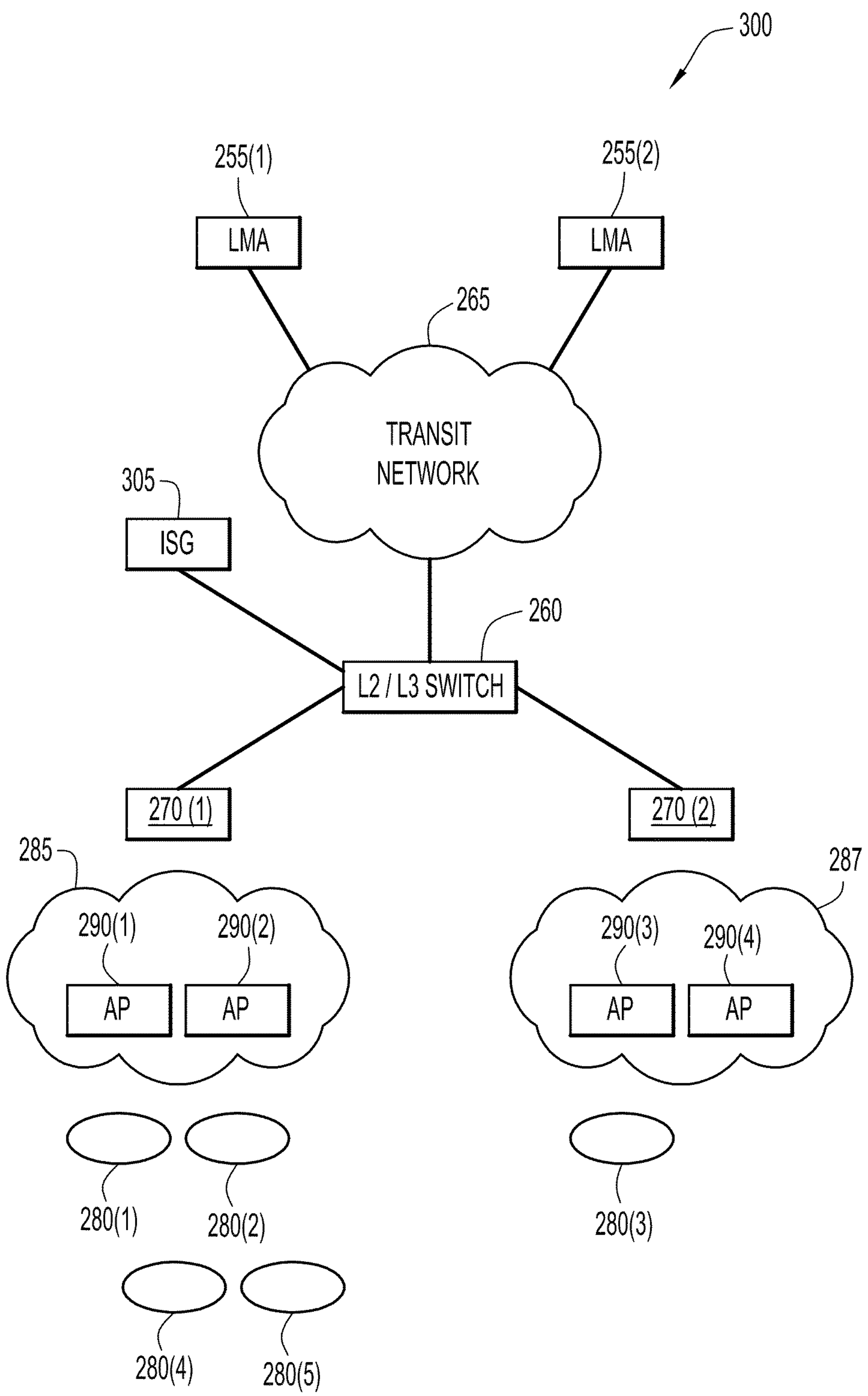
FIG. 5 is a diagram of another networking arrangement in which multiple client devices are assigned overlapping IP addresses.

FIG. 5 illustrates use of the multi-operator networking techniques in another arrangement 300 that includes PMIPv6 devices and simple IP devices that have overlapping IP addresses. The arrangement 300 is similar to arrangement 250 of FIG. 4 and includes LMAs 255(1) and 255(2) corresponding to first and second operators, respectively. The LMAs 255(1) and 255(2) are connected to switch 260 via transit network 265. Also connected to switch 260 is an Integrated Security Gateway (ISG) 305.

First and second wireless network controllers 270(1) and 270(2) are each configured with mobile access gateway functionality. Client devices 280(1) and 280(4) are wirelessly associated to access point 290(1) which is connected to wireless network controller 270(1) of WLAN 285. Similarly, client devices 280(2) and 280(5) are wirelessly associated to access point 290(2) which is connected to wireless network controller 270(1) of WLAN 285. Client device 280(3) is wirelessly associated to access point 290(3) which is connected to wireless network controller 270(3) of WLAN 287.

As noted above, the different LMAs 255(1) and 255(2) may assign the same IP address to different client devices on a given mobile access gateway. For example, two clients 280(2) and 280(3) on the same WLAN and VLAN have the same IP address. Client devices 280(1), 280(2), and 280(3) are PMIPv6 devices while client devices 280(4) and 280(5) are simple IP devices.

To ensure correct processing of upstream packets in the presence of overlapping IP addresses, the wireless network controllers 270(1) and 270(2) are first configured to determine if the transmitting client device is a PMIPv6 device or a simple IP device. This may be determined, for example, by using a previously stored client type. In one specific example, the client type is located using the incoming MAC address. If the transmitting client device is a PMIPv6 device, then the wireless network controllers 270(1) and 270(2) will tunnel the incoming packets to the appropriate LMA using the incoming MAC addresses, as described above. In other words, although the client devices 280(2) and 280(3) may have the same assigned IP addresses, their respective MAC addresses are unique. The wireless network controllers 270 (1) and 270(2) are then able to use the MAC addresses as identifiers to locate the correct tunneling information. Packets from simple IP devices are bridged as per existing/stand-alone wireless network controller methods.

Downstream packets for PMIPv6 clients are received at the wireless network controllers 270(1) and 270(2) via GRE tunnels, while packets for simple IP clients are received as L2 packets. Therefore, to ensure correct processing of downstream packets in the presence of overlapping IP addresses, the wireless network controllers 270(1) and 270(2) are configured to determine if a packet is received via a tunnel, and process packets received on the GRE tunnels based on the downstream GRE keys. Since downstream GRE keys are unique, the wireless network controllers 270(1) and 270(2) can use the GRE keys as identifiers to locate any information useable to correctly forward packets along the appropriate tunnel. Packets for simple IP client devices include the client device MAC address and thus are processed in accordance with existing/stand-alone wireless network controller methods.

Similar to the arrangement 250 of FIG. 4, the arrangement 300 of FIG. 5 may also support proxy-ARP functionality. The proxy-ARP functionality is supported in arrangement 300 by wireless network controllers 270(1) and 270(2). More specifically, in processing ARP requests at wireless network controllers 270(1) and 270(2) for client devices having overlapping IP addresses (e.g., client devices 280(2) and 280(3), if the requester is a PMIPv6 wireless client, the wireless network controllers 270(1) and 270(2) are configured to proxy-ARP with its own (virtual) MAC address. If the ARP requester is a simple IP wireless client, the wireless network controllers 270(1) and 270(2) will respond with a proxy-ARP only if there is a simple IP client with a matching IP address. Specifically, if there is a PMIPv6 client with a matching IP address, then the wireless network controllers 270(1) and 270(2) will not proxy-ARP on behalf of that client. If peer-to-peer (PRP) blocking is enabled, the wireless network controllers 270(1) and 270(2) will act on ARP requests in accordance with P2P blocking policy (i.e., drop or forward to the distribution network). If the requester is a wired client (i.e., a client that is on the distribution system), the wireless network controllers 270(1) and 270(2) will respond with a proxy-ARP only if there was a simple IP client with a matching IP address. If there is a PMIPv6 client with a matching IP address, then the wireless network controllers 270(1) and 270(2) will not proxy-ARP on behalf of that client.

Figure 6:
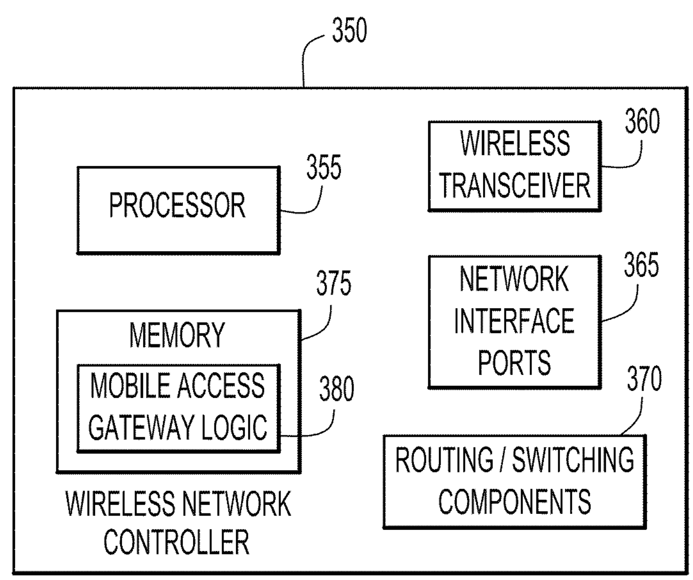
FIG. 6 is a block diagram of a wireless network controller configured in accordance with the multi-operator networking techniques.

FIG. 6 is a block diagram of a wireless network controller 350 configured to execute the multi-operator networking techniques so that multiple operators may share a single wireless network. Wireless network controller 350 includes a processor 355, a wireless transceiver (and supporting circuitry) 360, network interface ports 365 (e.g., Ethernet ports, Small Form-Factor Pluggable (SFP) transceivers, etc.), routing/switching components 370, and a memory 375. The memory 375 includes instructions for mobile access gateway logic 380, in addition to instructions for wireless network controller logic (not shown). The instructions for the mobile access gateway logic 380 cause the processor 355 of the wireless network controller 350 to perform the mobile access gateway operations/functionalities described herein.

Memory 375 may comprise read only memory (ROM), random access memory (RAM), magnetic disk storage media devices, optical storage media devices, flash memory devices, electrical, optical, or other physical/tangible memory storage devices. The processor 355 is, for example, a microprocessor or microcontroller that executes instructions for the mobile access gateway logic 380. Thus, in general, the memory 375 may comprise one or more tangible (non-transitory) computer readable storage media (e.g., a memory device) encoded with software comprising computer executable instructions and when the software is executed (by the processor 355) it is operable to perform the operations described herein in connection with the mobile access gateway.

Figure 7:
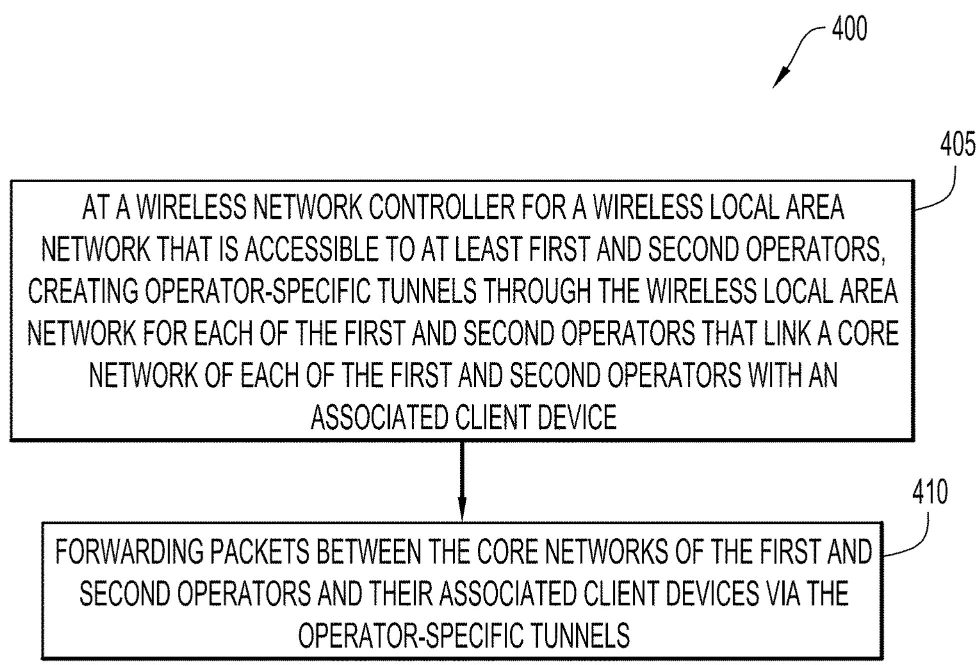
FIG. 7 is a high-level flowchart of an example method in accordance the multi-operator networking techniques.

FIG. 7 is a high-level flowchart of a method 400 executed at a wireless network controller in accordance with the multi-operator networking techniques. The wireless network controller is used in a WLAN accessible to first and second operators. At 405, an operator-specific tunnel through the WLAN for each of the first and second operators is created. The operator-specific tunnels link a core network of each of the first and second operators with an associated client device, respectively. At 410, packets are forwarded between the core networks of the first and second operators and their associated client devices via the operator-specific tunnels.

In certain examples, a profile may be received at the wireless network controller. The profile may include tunneling information for a first client device, and an operator-specific tunnel linking the core network of the first operator with the first client device may be created based on the tunneling information in the received profile. The profile may include an identification of a LMA associated with the first operator and which is useable by the first client device to transmit packets to the core network of the first operator. In a further example, the profile may include a Proxy Mobile Internet Protocol version 6 (PMIPv6) mobility context that comprises an Access Point Name (APN), an IP address of an LMA associated with the first operator, and a user identifier.

In one example, an operator-specific tunnel is created through the core network for the first operator that links the core network of the first operator with an associated client device. This tunnel is created by associating a first client device with an AAA server of the first operator, receiving, at the wireless network controller, a profile that includes tunneling information for the first client device, transmitting a PBU message with several tunneling attributes from the wireless network controller to an LMA associated with the first operator, and receiving a PBA message from the LMA.

The multi-operator networking techniques described herein use PMIPv6 with a wireless network controller (configured with mobile access gateway functionalities) to create operator-specific tunnels in a shared WLAN, such as a Wi-Fi network, that enable correct network forwarding despite overlapping/conflicting IP addresses. Networks arranged in accordance the multi-operator networking techniques can, in certain circumstances, support multiple operators over a single WLAN, establish multiple tunnels to the different operators, associate client devices to different operators, resolve the issue of overlapping IP addresses, and perform proxy-ARP operations in the presence of overlapping IP addresses.

The above description is intended by way of example only.

What is claimed is:

1. A method comprising:

at a wireless network controller configured to perform proxy Address Resolution Protocol (ARP) operations on behalf of connected client devices in a wireless local area network that is accessible to at least first and second operators, creating operator-specific tunnels through the wireless local area network for each of the first and second operators that link a core network of each of the first and second operators with an associated client device;

forwarding packets between the core networks of the first and second operators and their associated client devices via the operator-specific tunnels;

receiving an ARP request at the wireless network controller from a first client device;

determining that the ARP request is directed to a third client device having an Internet Protocol (IP) address that overlaps with the IP address of another client device; and determining a type of the first client device before processing the ARP request.

2. The method of claim 1, further comprising:

receiving, at the wireless network controller, a profile that includes tunneling information for a first client device; and creating an operator-specific tunnel linking the core network of the first operator with the first client device based on the tunneling information in the received profile.

3. The method of claim 2, wherein receiving the profile that includes tunneling information for the first client device comprises:

receiving an identification of a local mobility anchor (LMA) associated with the first operator and which is useable by the first client device to transmit packets to the core network of the first operator.

4. The method of claim 2, wherein receiving the profile indicating tunneling information for the first client device comprises:

receiving a Proxy Mobile Internet Protocol version 6 (PMIPv6) mobility context that includes, an Access Point Name (APN), an IP address of an LMA associated with the first operator, and a user identifier.

5. The method of claim 1, wherein creating comprises:

associating a first client device with an authentication, authorization, and accounting (AAA) server of the first operator;

receiving, at the wireless network controller, a profile that includes tunneling information for the first client device;

transmitting a Proxy Binding Update message with tunneling attributes from the wireless network controller to an Local Mobility Anchor associated with the first operator; and receiving a Proxy Binding Acknowledge message from the Local Mobility Anchor.

6. The method of claim 1, and wherein forwarding packets between the first and second operators and their associated client devices via the operator-specific tunnels comprises:

receiving an upstream packet, wherein the upstream packet is transmitted from a transmitting client device to an associated operator;

inspecting a media access control (MAC) address of the transmitting client device included in the upstream packet;

selecting, based on the MAC address of the transmitting client device, an operator-specific tunnel linking the transmitting client device with its associated operator; and forwarding the upstream packet along the selected operator-specific tunnel.

7. The method of claim 6, further comprising:

receiving a downstream packet at the wireless network device, wherein the downstream packet is transmitted from a transmitting operator to an associated receiving client device;

identifying a Generic Routing Encapsulation key corresponding to the receiving client device;

selecting, based on the Generic Routing Encapsulation key corresponding to the receiving client device, a corresponding operator-specific tunnel linking the transmitting operator with the receiving client device; and forwarding the downstream packet along the selected operator-specific tunnel.

8. The method of claim 1, wherein forwarding packets between the first and second operators and their associated client devices via the operator-specific tunnels comprises:

receiving an upstream packet at the wireless network controller, wherein the upstream packet is transmitted from a transmitting client device to an associated operator; and determining if the transmitting client device is a PMIPv6 device or a simple IP device;

if the transmitting client device is a PMIPv6 device:

inspecting a media access control (MAC) address of the transmitting client device included in the upstream packet;

selecting, based on the MAC address of the transmitting client device, an operator-specific tunnel linking the transmitting client device with its associated operator; and forwarding the upstream packet along the selected operator-specific tunnel.

9. The method of claim 8, further comprising:

receiving a downstream packet at the wireless network controller, wherein the downstream packet is transmitted from a transmitting operator to an associated receiving client device;

determining if the downstream packet was received via an operator-specific tunnel;

if the downstream packet was received via an operator-specific tunnel:

identifying a Generic Routing Encapsulation key corresponding to the receiving client device;

selecting, based on the Generic Routing Encapsulation key corresponding to the receiving client device, a corresponding operator-specific tunnel linking the transmitting operator with the receiving client device; and forwarding the downstream packet along the selected operator-specific tunnel.

10. The method of claim 1, further comprising:

determining that the first client device is a wireless client; and transmitting, in response to the ARP request, a MAC address of the wireless network controller to the first client device for use by the first client device in transmitting packets to the third client device.

11. The method of claim 1, further comprising:

determining that the first client device is a wired client; and transmitting a response to the ARP request only if the third client device is a simple IP client device.

12. An apparatus comprising:

a wireless transceiver;

one or more network interface ports;

a memory; and a processor configured to:

control a wireless local area network that is accessible to at least first and second operators, create operator-specific tunnels through the wireless local area network for each of the first and second operators that link a core network of each of the first and second operators with an associated client device, forward packets between the core networks of the first and second operators and their associated client devices via the operator-specific tunnels, perform proxy Address Resolution Protocol (ARP) operations on behalf of connected client devices, receive an ARP request at the wireless network controller from the first client device, determine that the ARP request is directed to a third client device having an Internet Protocol (IP) address that overlaps with the IP address of another client device, and determine a type of the first client device before processing the ARP request.

13. The apparatus of claim 12, wherein the processor is further configured to:

receive a profile that includes tunneling information for a first client device; and create an operator-specific tunnel linking the core network of the first operator with the first client device based on the tunneling information in the received profile.

14. The apparatus of claim 13, wherein to receive the profile that includes tunneling information for the first client device, the processor is configured to:

receive an identification of a local mobility anchor (LMA) associated with the first operator and which is useable by the first client device to transmit packets to the core network of the first operator.

15. The apparatus of claim 13, wherein to receive the profile that includes tunneling information for the first client device, the processor is configured to:

receive a Proxy Mobile Internet Protocol version 6 (PMIPv6) mobility context that includes, an Access Point Name (APN), an IP address of an LMA associated with the first operator, and a user identifier.

16. The apparatus of claim 12, wherein to create the operator-specific tunnels the processor is configured to:

associate a first client device with an authentication, authorization, and accounting (AAA) server of the first operator;

receive a profile that includes tunneling information for the first client device;

transmit a Proxy Binding Update message with tunneling attributes to an Local Mobility Anchor associated with the first operator; and receive a Proxy Binding Acknowledge message from the Local Mobility Anchor.

17. The apparatus of claim 12, wherein to forward packets between the first and second operators and their associated client devices via the operator-specific tunnels the processor is configured to:

receive an upstream packet, wherein the upstream packet is transmitted from a transmitting client device to an associated operator;

inspect a media access control (MAC) address of the transmitting client device included in the upstream packet;

select, based on the MAC address of the transmitting client device, an operator-specific tunnel linking the transmitting client device with its associated operator; and forward the upstream packet along the selected operator-specific tunnel.

18. The apparatus of claim 17, wherein the processor is further configured to:

receive a downstream packet at the wireless network device, wherein the downstream packet is transmitted from a transmitting operator to an associated receiving client device;

identify a Generic Routing Encapsulation key corresponding to the receiving client device;

select, based on the Generic Routing Encapsulation key corresponding to the receiving client device, a corresponding operator-specific tunnel linking the transmitting operator with the receiving client device; and forward the downstream packet along the selected operator-specific tunnel.

19. The apparatus of claim 12, wherein to forward packets between the first and second operators and their associated client devices via the operator-specific tunnels the processor is configured to:

receive an upstream packet transmitted from a transmitting client device to an associated operator; and determine if the transmitting client device is a PMIPv6 device or a simple IP device;

if the transmitting client device is a PMIPv6 device:

inspect a media access control (MAC) address of the transmitting client device included in the upstream packet;

select, based on the MAC address of the transmitting client device, an operator-specific tunnel linking the transmitting client device with its associated operator; and forward the upstream packet along the selected operator-specific tunnel.

20. The apparatus of claim 19, wherein the processor is configured to:

receive a downstream packet transmitted from a transmitting operator to an associated receiving client device;

determine if the downstream packet was received via an operator-specific tunnel;

if the downstream packet was received via an operator-specific tunnel:

identify a Generic Routing Encapsulation key corresponding to the receiving client device;

select, based on the Generic Routing Encapsulation key corresponding to the receiving client device, a corresponding operator-specific tunnel linking the transmitting operator with the receiving client device; and forward the downstream packet along the selected operator-specific tunnel.

21. The apparatus of claim 12, wherein the processor is configured to:

determine that the first client device is a wireless client; and transmit, in response to the ARP request, a MAC address of the apparatus to the first client device for use by the first client device in transmitting packets to the third client device.

22. The apparatus of claim 12, wherein the processor is configured to:

determine that the first client device is a wired client; and transmit a response to the ARP request only if the third client device is a simple IP client device.

23. One or more non-transitory computer readable storage media encoded with software comprising computer executable instructions and when the software is executed operable to:

at a wireless network controller configured to perform proxy Address Resolution Protocol (ARP) operations on behalf of connected client devices in a wireless local area network that is accessible to at least first and second operators, create operator-specific tunnels through the wireless local area network for each of the first and second operators that link a core network of each of the first and second operators with an associated client device;

forward packets between the core networks of the first and second operators and their associated client devices via the operator-specific tunnels;

receive an ARP request at the wireless network controller from a first client device;

determine that the ARP request is directed to a third client device having an Internet Protocol (IP) address that overlaps with the IP address of another client device; and determine a type of the first client device before processing the ARP request.

24. The non-transitory computer readable storage media of claim 23, further comprising instructions operable to:

receive, at the wireless network controller, a profile that includes tunneling information for a first client device; and create an operator-specific tunnel linking the core network of the first operator with the first client device based on the tunneling information in the received profile.

25. The non-transitory computer readable storage media of claim 24, wherein the instructions operable to receive the profile that includes tunneling information for the first client device comprise instructions operable to:

receive an identification of a local mobility anchor (LMA) associated with the first operator and which is useable by the first client device to transmit packets to the core network of the first operator.

26. The non-transitory computer readable storage media of claim 24, wherein the instructions operable to receive the profile that includes tunneling information for the first client device comprise instructions operable to:

receive a Proxy Mobile Internet Protocol version 6 (PMIPv6) mobility context that includes, an Access Point Name (APN), an IP address of an LMA associated with the first operator, and a user identifier.

27. The non-transitory computer readable storage media of claim 23, further comprising instructions operable to:

determine that the first client device is a wireless client; and transmit, in response to the ARP request, a MAC address of the apparatus to the first client device for use by the first client device in transmitting packets to the third client device.

28. The non-transitory computer readable storage media of claim 23, further comprising instructions operable to:

determine that the first client device is a wired client; and transmit a response to the ARP request only if the third client device is a simple IP client device.

* * * * *